US011320916B2

(12) United States Patent
Park et al.

(10) Patent No.: US 11,320,916 B2
(45) Date of Patent: May 3, 2022

(54) PEN HOLDING DEVICES

(71) Applicant: HEWLETT-PACKARD DEVELOPMENT COMPANY, L.P., Houston, TX (US)

(72) Inventors: Chan Woo Park, Houston, TX (US); Paul Roberto Lalinde, Houston, TX (US); Derek Kanas, Houston, TX (US)

(73) Assignee: Hewlett-Packard Development Company, L.P., Spring, TX (US)

( * ) Notice: Subject to any disclaimer, the term of this patent is extended or adjusted under 35 U.S.C. 154(b) by 366 days.

(21) Appl. No.: 16/092,112

(22) PCT Filed: Jul. 22, 2016

(86) PCT No.: PCT/US2016/043523
§ 371 (c)(1),
(2) Date: Oct. 8, 2018

(87) PCT Pub. No.: WO2018/017118
PCT Pub. Date: Jan. 25, 2018

(65) Prior Publication Data
US 2020/0333894 A1    Oct. 22, 2020

(51) Int. Cl.
*G06F 3/0354*     (2013.01)
*B43K 25/02*      (2006.01)
*B43K 27/02*      (2006.01)
*B43L 27/02*      (2006.01)

(52) U.S. Cl.
CPC .......... *G06F 3/03545* (2013.01); *B43K 25/02* (2013.01); *B43L 27/02* (2013.01); *G06F 2200/1632* (2013.01)

(58) Field of Classification Search
CPC ......... G06F 3/03545; G06F 2200/1632; G06F 2200/1635; B43K 25/02; B43K 29/20; B43L 27/02; B43L 27/04
See application file for complete search history.

(56) References Cited

U.S. PATENT DOCUMENTS

| 8,988,876 | B2 | 3/2015 | Corbin et al. |
| 9,153,125 | B2 | 10/2015 | Madonna et al. |
| 11,068,081 | B1* | 7/2021 | Kanas ................... G06F 1/1607 |
| 2010/0252337 | A1 | 10/2010 | Yang |

(Continued)

FOREIGN PATENT DOCUMENTS

| CN | 202189301 U | 4/2012 |
| CN | 203134164 U | 8/2013 |

(Continued)

OTHER PUBLICATIONS

"Microsoft Surface Pro 3 Stylus Pen Holder Storage Dock Mount".

(Continued)

*Primary Examiner* — Bryan Earles
(74) *Attorney, Agent, or Firm* — Brooks, Cameron & Huebsch PLLC (57) ABSTRACT

Example implementations relate to pen holding devices. In an example, a pen holding device can comprise a connector coupled to a receiver to couple the pen holding device to an electronic device, and the receiver including a magnet and a pen clip holder, the receiver to couple a pen via the magnet and the pen clip holder.

9 Claims, 5 Drawing Sheets

(56) References Cited

U.S. PATENT DOCUMENTS

| | | | |
|---|---|---|---|
| 2012/0295467 A1* | 11/2012 | Deng | H01R 13/6335 |
| | | | 439/345 |
| 2013/0295796 A1* | 11/2013 | Kato | H01R 27/02 |
| | | | 439/660 |
| 2013/0301200 A1* | 11/2013 | Leung | G06F 3/03545 |
| | | | 361/679.4 |
| 2014/0029183 A1* | 1/2014 | Ashcraft | H02J 50/90 |
| | | | 361/679.4 |
| 2014/0049851 A1 | 2/2014 | Snell et al. | |
| 2014/0078116 A1* | 3/2014 | Mercea | G06F 3/03545 |
| | | | 345/179 |
| 2015/0035809 A1 | 2/2015 | Kim et al. | |
| 2016/0026218 A1 | 1/2016 | Jefferies et al. | |
| 2016/0077843 A1* | 3/2016 | Jakoboski | H02J 7/0042 |
| | | | 710/8 |
| 2017/0097698 A1* | 4/2017 | Maeshima | G06F 3/03545 |
| 2017/0102739 A1* | 4/2017 | Zaloom | G06F 3/0393 |

FOREIGN PATENT DOCUMENTS

| | | |
|---|---|---|
| JP | 2005235570 A * | 9/2005 |
| JP | 5389708 B2 | 1/2014 |
| RU | 74721 U1 | 7/2008 |
| TW | 201019085 | 5/2010 |
| TW | M525043 | 7/2016 |

OTHER PUBLICATIONS

"Stylus Dock—Superior Surface Pen Holder-Storage Bracket-Exclusively for the Microsoft Surface Pro 3".
"XStylus Touch Stylus for iPad", Sep. 20, 2011.

* cited by examiner

PEN HOLDING DEVICES

BACKGROUND

An electronic device may allow a user to input commands via a number of different devices. The number of different devices may include a computer keyboard, a computer mouse, and a pen that can be mechanically and/or electronically coupled to the electronic device.

DETAILED DESCRIPTION

A pen holding device may be coupled to an electronic device and receive and couple to a pen. A user can attach and detach the pen from the pen holding device for use with the electronic device. For example, the user may use the pen to input a number of commands to the electronic device via the pen. The pen holding device may include a particular coupling mechanism to couple the pen to the pen holding device. For example, the pen holding device may include a magnet to provide a magnetic coupling between the pen and the pen holding device. However, in such approaches, a particular coupling mechanism may not be securely couple the pen to the pen holding device. For example, mere magnetic coupling may allow for free orientation (i.e., movement of the pen) of the pen along a longitudinal axis of the pen and/or such free orientation may weaken the magnetic coupling between the pen and the pen holding device. For instance, the pen may be inadvertently detached from the pen holding device.

The disclosure is directed to pen holding devices and systems including pen holding devices. For example, a pen holding device can include a connector coupled to a receiver to couple the pen holding device to an electronic device, and the receiver including a magnet and a pen clip holder to couple a pen (e.g., a stylus or other type of pen) via the magnet and the pen clip holder. Notably, the pen holding device, as described herein, can strengthen the coupling between the pen and the pen holding device by providing two or more coupling mechanisms such as a magnetic coupling and a frictional coupling that are employed at the same time.

As used herein, a frictional coupling refers to a coupling between a pen and a pen holding device, in which the pen holding device is to, when coupled to the pen, limit movement of the pen within the pen holding device via a frictional force. As used herein, a magnetic coupling refers to a coupling between a pen and a pen holding device, in which the pen holding device is to, when coupled to the pen, limit movement of the pen within the pen holding device via a magnetic force.

Figure 1:
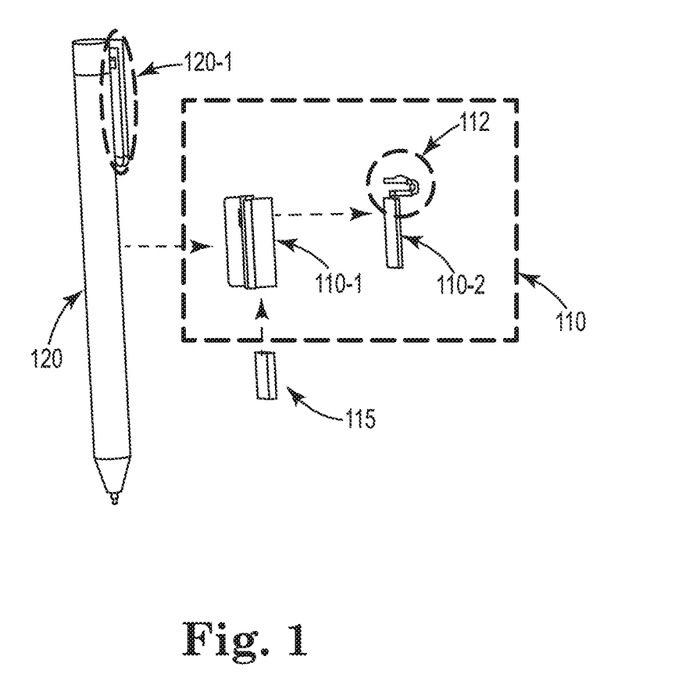
FIG. 1 illustrates an example of a pen holding device according to the disclosure.

FIG. 1 illustrates an example of a pen holding device 110 according to the disclosure. In various examples, the pen holding device 110 can comprise a connector 110-2 coupled to a receiver 110-1 to couple the pen holding device 110 to an electronic device (not shown), and the receiver 110-1 including a magnet 115 and a pen clip holder (not shown) to couple a pen 120 via the magnet and the pen clip holder (not shown).

In various examples, the receiver 110-1 can include a magnet 115 to couple the pen 120 to the receiver 110-1. For example, as illustrated in FIG. 1, the receiver 110-1 can include the magnet 115. The magnet 115 coupled to the receiver 110-1 can provide a magnetic coupling between the receiver 110-1 and the pen 120. for example, the pen 120 can be formed at least in part of a metal (e.g., steel, etc.) that is readily coupled to the magnet 115. The pen 120 can be a stylus to interact with an electronic device and/or another type of pen such as those including ink or other writing materials. In various examples, the magnet 115 can be positioned adjacent to the pen clip holder to couple the pen via both the magnet and the pen clip holder at the same time. For example, when the pen 120 is being coupled to the pen clip holder 110, the magnetic coupling and the frictional coupling can occur at the same time as the magnet 115 is positioned adjacent to the pen clip holder.

Figure 2A:
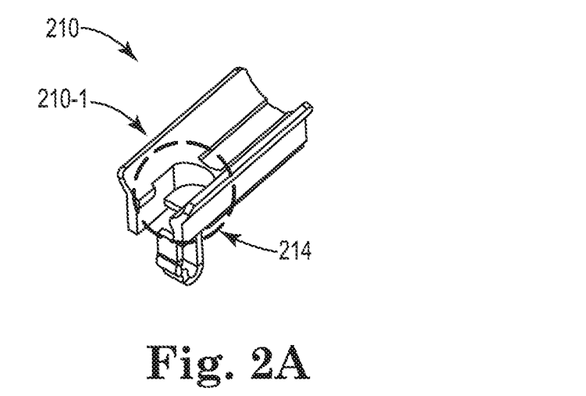
FIGS. 2A and 2B illustrate an example of a pen holding device according to the disclosure.
Figure 2B:
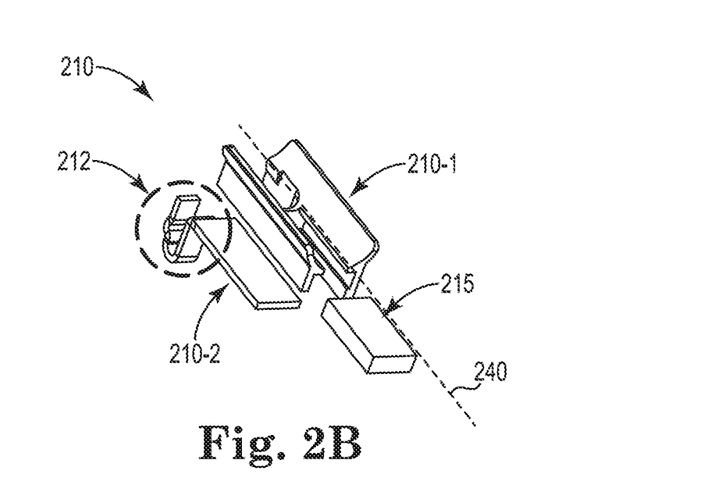

In various examples, the receiver 110-1 can include a pen clip holder (not shown in FIG. 1) to couple the pen 120 to the receiver 110-1. For example, as detailed with respect to FIG. 2, the receiver 110-1 can include the pen clip holder to couple a pen clip 120-1 of the pen 120. By providing two different coupling mechanisms such as magnetic coupling and frictional coupling, the pen holding device can strengthen the coupling between the pen 120 and the pen holding device 110 in contrast to other approaches that may employ a lone type of coupling mechanism by itself.

In some examples, the receiver 110-1 can be unremovably coupled to the connector 110-2 to prevent a disassembly of the pen holding device. For example, the pen holding device 110, as described in FIG. 1, can comprise two different components: the receiver 110-1 and the connector 110-2 that can be coupled to each other in an unremovable manner (i.e., nonremovably coupled). In some examples, the pen holding device 110 can comprise a plastic connector (e.g., a connector 110-2) and a metal receiver (e.g., a receiver 110-1), in which the metal receiver is insert-molded into the plastic receiver to form a pen holding device. In some examples, the plastic connector can be glued to the metal receiver. However, examples are not limited so. For example, the pen holding device 110 can be a continuous metal body that is manufactured by a computer numeric control (CNC) machine.

In various examples, the receiver 110-1 includes a snap feature (not shown) to couple and detach the pen, as describe herein. For example, when coupling the pen 120 as illustrated in FIG. 1, the snap feature of the receiver 110-1 can flexibly open wide to couple the pen 120, and restore its original state once the pen 120 is coupled to the receiver 110-1.

In various example, the connector 110-2 includes a flexible end 112 forming a flexible U-shaped end disposable against a surface of a standardized interface of the electronic device to removably couple the pen holding device 110 to the electronic device (not shown). For example, as illustrated in FIG. 1, the connector 110-2 can include a connector 112 that is a U-shaped and flexible, as described herein. For example, when being coupled to the standardized interface, the flexible end 112 can be compressed to be deformably coupled to the standardized interface by exerting spring tension against the surface of the standardized interface.

When decoupled from the standardized interface the flexible end 112 can restore to its original state/shape.

FIGS. 2A and 2B illustrate an example of a pen holding device 210 according to the disclosure. The pen holding device 210 illustrated in FIGS. 2A and 2B can be analogous to the pen holding device 110 as illustrated in FIG. 1. For example, the receiver 220-1 and the connector 210-2 of the pen holding device 210 illustrated in FIGS. 2A and 2B are analogous to the receiver 110-1 and the connector 110-2 of the pen holding device 110 as illustrated in FIG. 1, respectively.

FIG. 2A illustrates an example of the pen holding device 210 with a pen clip holder 214. In various examples, the receiver 210-1 can couple a pen clip of the pen (not shown) to provide additional frictional coupling via the pen clip holder 214. For example, the pen clip holder 214 can be specialized in coupling the pen clip (e.g., a pen clip 120-1). In this example, the pen holding device 210 can be designed to fit for the pen (not shown) such that frictional force that may exerted to the pen while the pen (not shown) is coupled to the pen holding device. By providing additional mechanism of coupling the pen to the pen holding device, the pen clip holder 214, as illustrated in FIG. 2A, can further strengthen the frictional coupling as described herein.

FIG. 2B illustrates an example of a pen holding device 210 according to the disclosure. In various examples, as described herein, the receiver 210-1 can couple the pen (not shown) moving along an axis 240, as described herein. For example, the pen (not shown) can be slidely inserted into the receiver 210-1 along the axis 240 such that the pen (not shown) can be coupled to the receiver 210-1. However, examples are not limited so. For example, the receiver 210-1 can couple the pen (not shown) moving along an axis perpendicular to the axis 240. In this example, the receiver 210-1 can include a snap feature to flexibly coupe the pen (not shown) moving along the axis perpendicular to axis 240, and to provide the coupling between the receiver 210-1 and the pen (not shown), as described herein.

In various examples, the receiver can, upon coupling the pen clip, limit an orientation of the pen along a longitudinal axis 240 of the pen to secure the coupling between the pen and the receiver. For example, a pen holding device without a pen clip holder (e.g., 240) may allow for free orientation (i.e., rotation and movement of the pen) of the pen along a longitudinal axis 240 of the pen and/or such free orientation may weaken the magnetic coupling and the frictional coupling between the pen and the pen holding device. For instance, the pen may be inadvertently detached from the pen holding device. By not allowing the free orientation of the pen along the longitudinal axis 240 of the pen, the pen holding device 210 may secure the coupling between the pen holding device 210 and the pen.

In some examples, the pen holding device 210 may include the pen clip holder 240 without a magnet 215 that provides the magnetic coupling. For example, the connector 210-2 may couple the pen to the pen holding device 210 via the pen clip holder 214 without the magnet 215 such that the pen can be coupled to the pen holding device 210 via the frictional coupling without the magnetic coupling. In some examples, a length of the connector 210-2 along the longitudinal axis 240 can be designed to provide a stronger frictional coupling between the pen holding device 210 and the pen. For instance, the length of the connector 210-2 can be extended along the longitudinal axis 240 to provide more surface area of the connector 210-2 that can be in contact with the pen. By providing more surface area, the pen holding device 210-2 can limit the orientation of the pen coupled to the pen holding device 210-2 along the longitudinal axis 240 without a pen clip holder 214.

In various examples, the connector 210-2, as illustrated in FIG. 2B, can couple the pen holding device 210 to the electronic device (not shown) via a standardized interface of the electronic device. For example, the connector 210-2 can include a flexible end 212 disposable against a surface of a standardized interface (not shown) of the electronic device to removably couple the pen holding device 210 to the electronic device (not shown). For example, when being coupled to the standardized interface, the flexible end 212 can be compressed to be deformably coupled to the standardized interface, and restore its original state upon completing the coupling to exert spring tension by disposing itself against the surface of the standardized interface. Although examples are not limited so, the flexible end, as illustrated in FIG. 2A, can form a U-shaped end.

In some examples, a receiving surface of the receiver 210-1 can be concave. For example, the receiving surface of the receiver 210-1 that can, when coupled to the pen, be in contact with the pen can be concave such that the pen with a circular longitudinal surface can fit to the receiving surface of the receiver 210-1. In this examples, the magnet 215 that can be included in the receiver 210-1 can also be a curved-shape (e.g., concave) to fit into the concave-shaped receiver 210-1, and to provide more surface area of the magnet 215 that can be in contact with the pen. By having a receiver 210-1 specialized for a longitudinal surface of a pen, the pen holding device 210 can provide a stronger magnetic and frictional coupling between the pen and the pen holding device 210.

Figure 3:
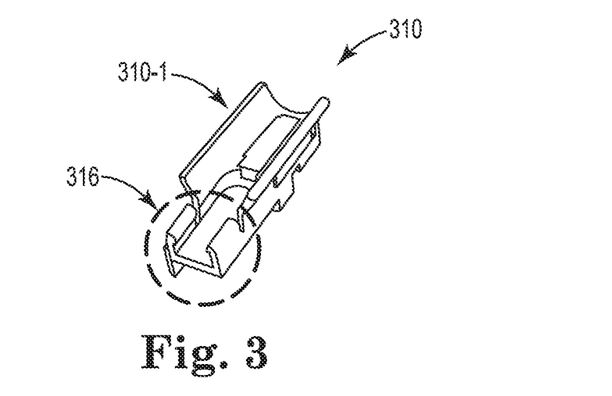
FIG. 3 illustrates an example of a pen holding device with a snap feature according to the disclosure.

FIG. 3 illustrates an example of a pen holding device 310 with a snap feature 316 according to the disclosure. The pen holding device 310 illustrated in FIG. 3 is analogous to the pen holding device 110 and 210 as illustrated in FIG. 1 and FIG. 2, respectively. For example, the receiver 310-1 of the pen holding device 310 can be analogous to the receiver 110-1 and the receiver 210-1 as illustrated in FIG. 1 and FIG. 2, respectively.

In various examples, the receiver 310-1 includes a snap feature 316 to couple and detach the pen. In this example, the plurality of flexible ends can provide the snap feature 316 for the coupling by flexibly opening wide to receive the pen (not shown), and restore its original state once the pen is coupled to the receiver 310-1. For instance, when the pen is completely coupled to the receiver 310-1, the plurality of flexible ends can restore its original state to hold the pen (not shown) such that pen (not shown) can be coupled to the pen holding device 310 via a frictional coupling. By flexibly coupling and detaching the pen from the pen holding device 310, the snap feature 316 may prevent the pen holding device 310 that holds the pen via the frictional coupling from being broken when coupling or detaching the pen.

Figure 4:
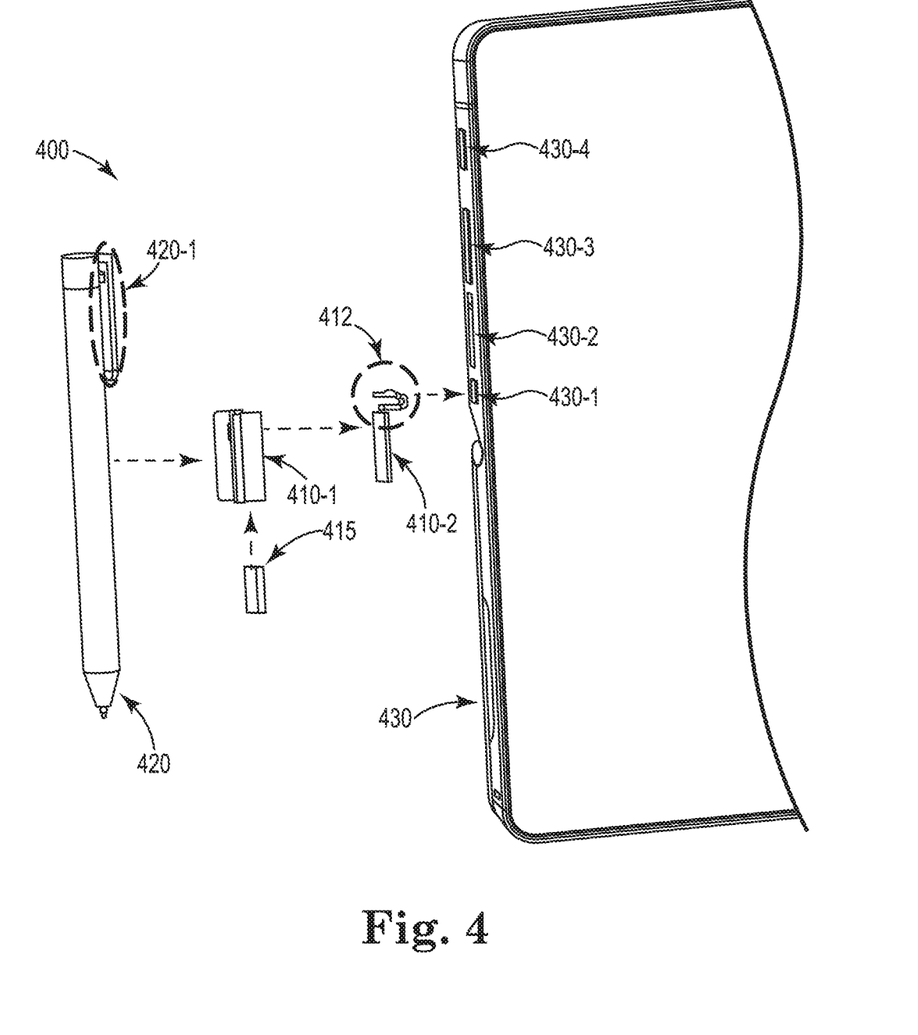
FIG. 4 illustrates an example of a system including a pen holding device according to the disclosure.

FIG. 4 illustrates an example of a system 400 including a pen holding device 410 according to the disclosure. As illustrated in FIG. 4, the system 400 can include a pen holding device 410, a pen 420, and an electronic device 430. The pen holding device 410 illustrated in FIG. 4 is analogous to the pen holding device 110, 210, and 310 as illustrated in FIG. 1, FIG. 2, and FIG. 3, respectively. As illustrated in FIG. 4, the pen holding device 410 can include a receiver 410-1 and a connector 410-2 that are analogous to the receiver 110-1, 210-1, and 310-1, and the connector 110-2, 210-2, and 310-2 as illustrated in FIG. 1, FIG. 2, and FIG. 3, respectively.

In various examples, the system 400 can comprise the electronic device 430 to which the pen holding device 410 can be coupled to, and the pen holding device 430 to removably couple the pen 420 to the pen holding device 430 via a magnet 415, and a pen clip holder (not shown). For example, the pen holding device 410 can include the receiver 410-1 and the connector 410-2 that can be unremovably coupled to each other, although examples are not limited so.

The receiver 410-1 can include the magnet 415 to provide a magnetic coupling between the pen 420 and the pen holding device 410. The receiver 410-1 can also include the pen clip holder (not shown) that is analogous to the pen clip holder 214 as illustrated in FIG. 2. For example, the receiver 410-1 can, upon coupling the pen clip 420-1, limit an orientation of the pen 420 along a longitudinal axis (e.g., an axis 240 as illustrated in FIG. 2B) of the pen to secure the coupling between the pen 420 and the receiver 420-1.

In various examples, the electronic device 430 can include a plurality of standardized interfaces. For example, as illustrated in FIG. 4, the electronic device 430 may include a plurality of standardized interface 430-1, 430-2, 430-3, and 430-4. Although examples are not limited so, at least some of the plurality of standardized interface of the electronic device can include different form factors. For example, as described here, the plurality of standardized interfaces 430-1, 430-2, 430-3, and 430-4 can include a high definition multimedia interface (HDMI), a micro secure digital (SD) card, a kensington lock, a cable lock, and/or a universal serial bus (USB) standardized interface, among other possibilities. As used herein, the form factor refers to a physical size and shape of a standardized interface. The pen holding device 410 can include a plurality of connectors (e.g., a connector 410-2 as illustrated in FIG. 4) to be coupled to the electronic device via the plurality of standardized interfaces 430-1, 430-2, 430-3, and 430-4.

Figure 5:
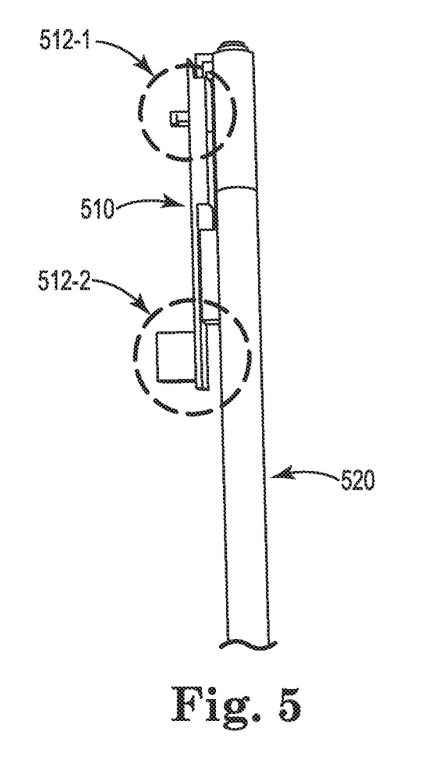
FIG. 5 illustrates an example of a pen holding device with a plurality of connectors according to the disclosure.

FIG. 5 illustrates an example of a pen holding device 510 with a plurality of connectors (e.g. connectors 512-1 and 512-2) according to the disclosure. The pen holding device 510 illustrated in FIG. 5 is analogous to the pen holding device 110, 210, 310, and 410 of FIG. 1, FIG. 2, FIG. 3, and FIG. 4, respectively. As illustrated in FIG. 5, the pen 520 is coupled to the pen holding device 510, as described herein, via a magnet (not shown) and a pen clip holder (not shown) that are analogous to the magnet 115 and the pen clip holder 214 as illustrated in FIG. 1 and FIG. 2B.

In various examples, as illustrated in FIG. 5, the pen holding device 510 can include a plurality of connectors. For example, the pen holding device 510 can include a plurality of connectors 512-1 and 512-2 as illustrated in FIG. 5. Each of the plurality of connectors 512-1 and 512-2 can be coupled to a respective standardized interface of the electronic device. In some examples, although examples are not limited so, the connector 512-1 can be coupled to a HDMI standardized interface of the electronic device (not shown), and the connector 512-2 can be coupled to a cable lock of the electronic device (not shown). In some examples, the connector 512-1 can be coupled to the cable lock, and the connector 512-2 can be coupled to a USB standardized interface. By having a plurality of connectors by which the pen holding device 510 can be coupled to the electronic device at the same time, the pen holding device 510 can provide a stronger coupling between the pen holding device 510 and the electronic device than other approaches that may employ a particular type of coupling mechanism by itself. However, the disclosure is not limited so. For example, pen holding device 510 may include a connector (as illustrated in FIG. 1 and FIG. 2) to couple the pen holding device 510 to a standardized interface of the electronic device. For example, the pen holding device 510 can include a connector that can be coupled to a kensington lock standardized interface of the electronic device. Although examples are not limited so, the pen holding device 510 with the connector for the Kensington lock standardized interface may be a continuous metal body.

In various examples, at least one of the plurality of connectors can include a flexible end, as described herein. For example, at least one of the plurality of connectors 512-1 and 512-2 can include a flexible end, and when coupled to the standardized interface, the flexible end can provide spring tension to secure the coupling between the connector and the standardized interface, as described herein.

Since many examples can be made without departing from the spirit and scope of the system and method of the disclosure, this specification merely sets forth some of the many possible example configurations and implementations. In the disclosure, reference is made to the accompanying drawings that form a part hereof, and in which is shown by way of illustration how a number of examples of the disclosure can be practiced. These examples are described in sufficient detail to enable those of ordinary skill in the art to practice the examples of this disclosure, and it is to be understood that other examples can be used and that process, electrical, and/or structural changes can be made without departing from the scope of the disclosure.

The figures herein follow a numbering convention in which the first digit corresponds to the drawing figure number and the remaining digits identify an element or component in the drawing. Elements shown in the various figures herein can be added, exchanged, and/or eliminated so as to provide a number of additional examples of the disclosure. In addition, the proportion and the relative scale of the elements provided in the figures are intended to illustrate the examples of the disclosure, and should not be taken in a limiting sense.

What is claimed:

1. A pen holding device, comprising:
a connector coupled to a receiver, wherein the connector includes a U-shaped flexible end that extends from a distal end of the connector and is disposable against a surface of a standardized interface of an electronic device to compress the U-shaped flexible end and thereby exert spring tension against the surface of the standardized interface to removably couple the pen holding device to a standardized interface of a plurality of standardized interfaces of the electronic device, wherein the plurality of standardized interfaces includes a high definition multimedia interface (HDMI) standardized interface, a micro secure digital (SD) card standardized interface, a kensington lock standardized interface, a cable lock standardized interface, or a universal serial bus (USB) standardized interface; and
the receiver including a magnet and a pen clip holder, the receiver to couple a pen via the magnet and the pen clip holder, and wherein the pen holding device includes a plurality of connectors, each of the plurality of connectors is to be coupled to a respective standardized interface of the electronic device.

2. The device of claim 1, wherein the receiver is unremovably coupled to the connector to prevent a disassembly of the pen holding device.

3. The device of claim 1, wherein the pen holding device includes the magnet positioned adjacent to the pen clip holder to couple the pen via both the magnet and the pen clip holder at the same time.

4. The device of claim 1, wherein the receiver is to couple a pen clip of the pen to provide additional frictional coupling via the pen clip holder.

5. The device of claim 3, wherein the receiver is to, upon coupling the pen clip, limit an orientation of the pen along a longitudinal axis of the pen to secure the coupling between the pen and the receiver.

6. The device of claim 1, wherein the receiver includes a snap feature to couple and detach the pen.

7. A system, comprising:
 an electronic device including a standardized interface; and
 a pen holding device including a connector with a U-shaped flexible end that extends from a distal end of the connector and is disposable against a surface of a standardized interface of an electronic device to compress the U-shaped flexible end and thereby exert spring tension against the surface of the standardized interface to removably couple the pen holding device to a surface of a standardized interface of the electronic device and wherein the pen holding device includes a magnet and a pen clip holder to removably couple to a pen via the magnet and the pen clip holder, wherein the standardized interface is included in a plurality of standardized interfaces, and wherein the pen holding device includes a plurality of connectors, each of the plurality of connectors is to be coupled to a respective standardized interface of the electronic device,
 wherein the plurality of standardized interfaces includes a high definition multimedia interface (HDMI) standardized interface, a micro secure digital (SD) card standardized interface, a kensington lock standardized interface, a cable lock standardized interface, or a universal serial bus (USB) standardized interface.

8. The system of claim 7, wherein at least some of the plurality of standardized interfaces includes different form factors.

9. The system of claim 7, wherein the pen holding device includes two connectors, a first connector is to be coupled to the cable lock standardized interface, and a second connector is to be coupled to the HDMI standardized interface.

\* \* \* \* \*